United States Patent
Martin et al.

(10) Patent No.: US 11,093,477 B1
(45) Date of Patent: Aug. 17, 2021

(54) MULTIPLE SOURCE DATABASE SYSTEM CONSOLIDATION

(71) Applicant: INTERNATIONAL BUSINESS MACHINES CORPORATION, Armonk, NY (US)

(72) Inventors: Daniel Martin, Stuttgart (DE); Jia Heng Zhong, San Jose, CA (US); Sowmya Kameswaran, San Jose, CA (US); Manogari Nogi Simanjuntak, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/820,790

(22) Filed: Mar. 17, 2020

(51) Int. Cl.
| | |
|---|---|
| *G06F 16/00* | (2019.01) |
| *G06F 16/23* | (2019.01) |
| *G06F 16/245* | (2019.01) |
| *G06F 16/182* | (2019.01) |
| *G06F 16/178* | (2019.01) |
| *G06F 16/22* | (2019.01) |

(52) U.S. Cl.
CPC ........ *G06F 16/2322* (2019.01); *G06F 16/178* (2019.01); *G06F 16/182* (2019.01); *G06F 16/2282* (2019.01); *G06F 16/245* (2019.01)

(58) Field of Classification Search
CPC ............. G06F 16/2322; G06F 16/2329; G06F 16/182; G06F 16/245; G06F 16/2282; G06F 16/178
USPC ........................................................ 707/610
See application file for complete search history.

(56) References Cited

U.S. PATENT DOCUMENTS

| | | | |
|---|---|---|---|
| 7,162,467 B2 | 1/2007 | Eshleman | |
| 8,473,450 B2 | 6/2013 | Bakalash | |
| 9,032,017 B1* | 5/2015 | Singh | G06F 9/5055 709/203 |
| 10,037,346 B1* | 7/2018 | Hsieh | G06F 16/20 |
| 10,282,363 B2 | 5/2019 | Hrle | |
| 10,452,682 B2 | 10/2019 | Bendel | |
| 10,545,992 B2 | 1/2020 | Bendel | |
| 2003/0212660 A1* | 11/2003 | Kerwin | G06F 16/252 |
| 2010/0205323 A1* | 8/2010 | Bareness | G06F 16/2455 709/248 |
| 2011/0208808 A1* | 8/2011 | Corbett | G06F 16/2453 709/203 |
| 2014/0229437 A1* | 8/2014 | Takeuchi | G06F 16/275 707/624 |
| 2015/0142749 A1* | 5/2015 | Broll | G06F 16/113 707/654 |
| 2018/0253463 A1* | 9/2018 | Bastawala | G06N 20/00 |

(Continued)

*Primary Examiner* — Thanh-Ha Dang
(74) *Attorney, Agent, or Firm* — Schmeiser, Olsen & Watts; Stephanie Carusillo (57) ABSTRACT

A method, system, and program product for enabling multiple source database coherency is provided. The method includes detecting an incoming query to be executed with respect to an accelerator server. An initial timestamp of the incoming query is analyzed and additional timestamps of database tables referenced by the incoming query are retrieved. It is determined that each timestamp of the additional timestamps is reached with respect to a corresponding replication engine and target data from the database tables is synchronized with source data of a source database. In response, the incoming query is accelerated for execution with respect to a target database management system.

20 Claims, 7 Drawing Sheets

(56) References Cited

U.S. PATENT DOCUMENTS

| | | |
|---|---|---|
| 2019/0018880 A1 | 1/2019 | Bendel |
| 2019/0220467 A1 | 7/2019 | Hrle |
| 2019/0220468 A1 | 7/2019 | Hrle |
| 2019/0347273 A1 | 11/2019 | Bendel |
| 2019/0347274 A1 | 11/2019 | Bendel |
| 2019/0347342 A1* | 11/2019 | Kameswaran ...... G06F 11/3024 |

* cited by examiner

MULTIPLE SOURCE DATABASE SYSTEM CONSOLIDATION

BACKGROUND

The present invention relates generally to a method for enabling multiple source database coherency in a shared database system and in particular to a method and associated system for improving software and memory technology associated with accelerating a database query for execution with respect to a target database management system.

SUMMARY

A first aspect of the invention provides a multiple source database coherency method comprising: detecting, by a processor of an accelerator server, an incoming query to be executed with respect to the accelerator server; analyzing, by the processor, an initial timestamp of the incoming query; retrieving, by the processor, additional timestamps of database tables referenced by the incoming query; first determining, by the processor, that each timestamp of the additional timestamps is reached with respect to a corresponding replication engine of the accelerator server; determining, by the processor based on results of the analyzing and the first determining, that target data from the database tables referenced by the incoming query and located within a target database management system (DBMS) is synchronized with source data of a source DBMS; and accelerating, by the processor in response to results of the determining, the incoming query for execution with respect to the target DBMS.

A second aspect of the invention provides a computer program product, comprising a computer readable hardware storage device storing a computer readable program code, the computer readable program code comprising an algorithm that when executed by a processor of an accelerator server implements a multiple source database coherency method, the method comprising: detecting, by the processor, an incoming query to be executed with respect to the accelerator server; analyzing, by the processor, an initial timestamp of the incoming query; retrieving, by the processor, additional timestamps of database tables referenced by the incoming query; first determining, by the processor, that each timestamp of the additional timestamps is reached with respect to a corresponding replication engine of the accelerator server; determining, by the processor based on results of the analyzing and the first determining, that target data from the database tables referenced by the incoming query and located within a target database management system (DBMS) is synchronized with source data of a source DBMS; and accelerating, by the processor in response to results of the determining, the incoming query for execution with respect to the target DBMS.

A third aspect of the invention provides an accelerator server comprising a processor coupled to a computer-readable memory unit, the memory unit comprising instructions that when executed by the processor implements a multiple source database coherency method comprising: detecting, by the processor, an incoming query to be executed with respect to the accelerator server; analyzing, by the processor, an initial timestamp of the incoming query; retrieving, by the processor, additional timestamps of database tables referenced by the incoming query; first determining, by the processor, that each timestamp of the additional timestamps is reached with respect to a corresponding replication engine of the accelerator server; determining, by the processor based on results of the analyzing and the first determining, that target data from the database tables referenced by the incoming query and located within a target database management system (DBMS) is synchronized with source data of a source DBMS; and accelerating, by the processor in response to results of the determining, the incoming query for execution with respect to the target DBMS.

The present invention advantageously provides a simple method and associated system capable of accurately enabling multiple source database coherency in a shared database system.

DETAILED DESCRIPTION

Figure 1:
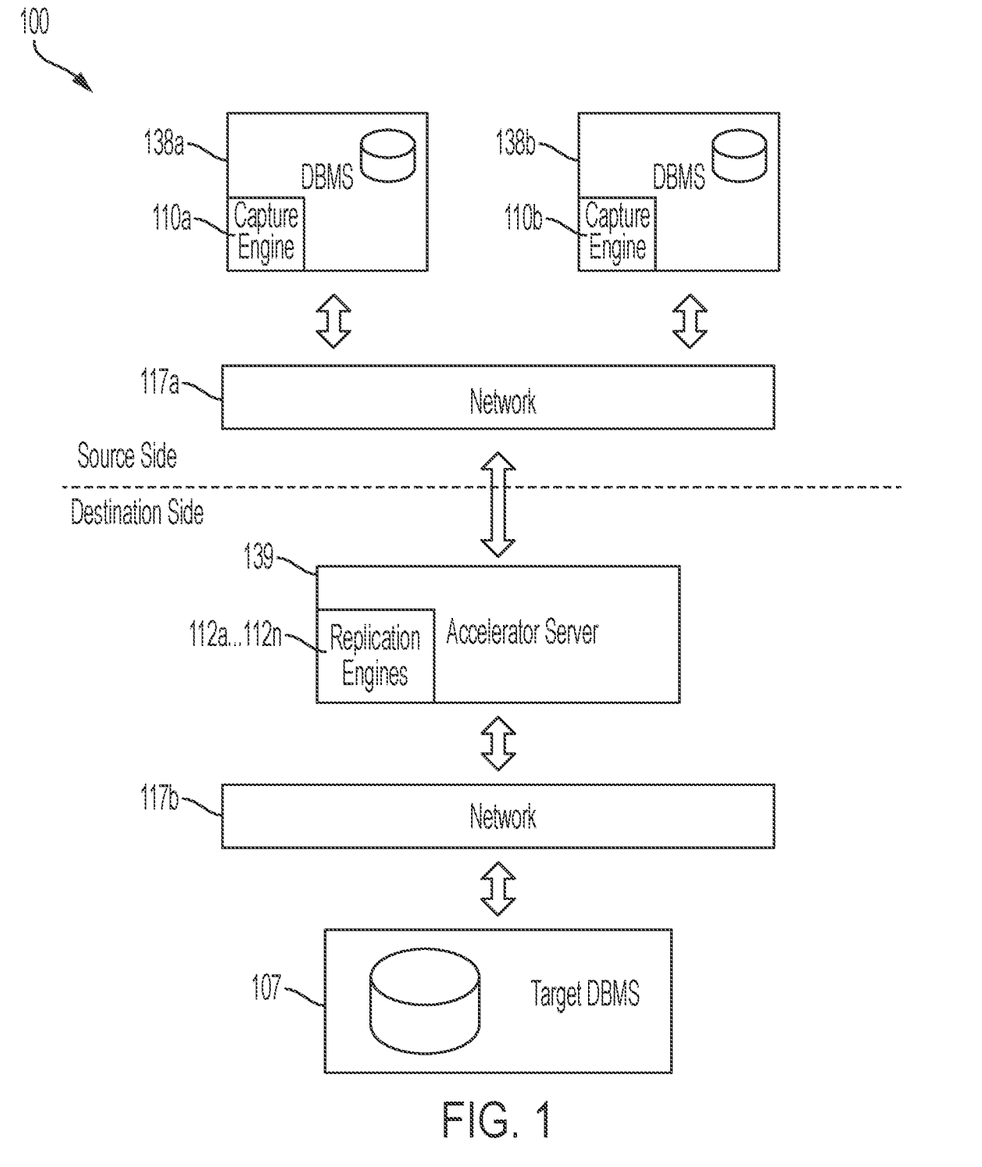
FIG. 1 illustrates a system for improving software and memory technology associated with accelerating a database query for execution with respect to a target database management system, in accordance with embodiments of the present invention.

FIG. 1 illustrates a system 100 for improving software and memory technology associated with accelerating a database query for execution with respect to a target database management system, in accordance with embodiments of the present invention. A typical shared database system may include usage of software applications requiring access to recent data regardless operational attributes (e.g., online analytical processing (OLAP), online transactional processing (OLTP), etc.). Likewise, data consistency and associated coherency may be required during data access processes executed with respect to multiple connected data source apparatuses thereby ensuring that software applications are associated with a most recent and correct version of input data for analysis.

Typical multiple database management systems (DBMS) may be connected to each other via usage of an accelerator process for maintaining a copy of data from various sources to provide a global view. A current wait protocol associated with an accelerator system may only function for a source database originating a query as all additional source databases connected to the accelerator system are typically independent from each other.

Therefore system 100 enables a process for allowing data from an originating source and referenced sources to maintain A current status within the accelerator system for executing a federated query. A federated query may be enabled by:
1. Allowing a replication engine to retrieve a last modification timestamp of referenced tables
2. Delaying query execution until a replication process for each table has achieved a target timestamp.
3. Initiating the federated query within the accelerator when all tables achieve a target timestamp within a specified time limit.
4. Return an error signal to an originating source if any table has been determined to fail to reach a target timestamp.

Typical data transfer processes only allow a wait protocol to ensure that data from an originating source is current for a federated query, which may use stale data to produce an outdated result when any portion of a replication process is lagging.

System 100 enables a process for maintaining data coherency and providing failback options by determining that all data is in sync with a target database and determining that an incoming query is to be accelerated or executed with respect to an accelerator server (e.g., accelerator server 139). The process for maintaining data coherency and providing failback options may include the following functionality associated with DBMS access:
1. Determining if an incoming query is to be accelerated or executed with respect to an accelerator server. A reference (synonym) removal process may be executed (when the need for data access is complete) with respect to target DBMS permissions granted to enable data sharing between a requestor DBMS and a source DBMS may be revoked.
2. Verifying timestamps to determine if data for all tables referenced by the incoming query within a target DBMS is up to date with data of the source DBMS. If the data for all tables referenced by the incoming query is not determined to be up to date with the data of the source DBMS, then query execution is temporarily disabled until data flow between source DBMS and target DBMS is synchronized.
3. If data flow between source DBMS and target DBMS is determined to be synchronized, the incoming query is accelerated with respect to the target DBMS and system 100 replicates or loads data for one or more tables from various source DBMS' into the shared accelerator server. The shared accelerator server may be configured to be shared between multiple source DBMS' that require operation with data in a federated fashion associated with incoming OLAP (online analytical processing) queries on a single DBMS requiring data access from additional DBMS systems without physically owning/hosting the data.
4. Executing OLAP queries requiring data access from various DBMS systems connected to the shared accelerator. System is configured to execute a grant step (providing temporary access to the requestor DBMS for the source tables/source DBMS) and a reference creation step for creating a synonym (link) on the requestor DBMS for tables requiring access on the requestor DBMS.

System 100 of FIG. 1 includes DBMS servers 138a and 138b (i.e., specialized hardware device), an accelerator server 139, and a target DBMS 107 (e.g., a cloud-based system) interconnected through a network 117a and 117b. Network 117a is associated with a source side of system 100 and network 117b is associated with a destination side of system 100. Accelerator server 139 may include, inter alia, a computing device, a server, a dedicated hardware device, etc. Accelerator server 139 may be Bluetooth enabled to provide connectivity to any type of system. Accelerator server 139 includes specialized circuitry/software include specialized replication engine software 112a . . . 112n). DBMS servers 138a and 138b include capture engines 110a and 110b (e.g., implemented in software, hardware, etc). DBMS servers 138a and 138b, target DBMS 107, and accelerator server 139 may each comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, DBMS servers 138a and 138b, target DBMS 107, and accelerator server 139 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software and memory technology associated with accelerating a database query for execution with respect to a target database management system, in accordance with embodiments of the present invention. Network 117a and 117b may include any type of network including, inter alia, a 5G telecom network, a local area network, (LAN), a wide area network (WAN), the Internet, a wireless network, etc. Alternatively, network 117a and 117b may include an application programming interface (API).

System 100 enables the following process for enabling a system wait protocol (for multiple source systems) for ensuring that data is current within accelerator server 139. The wait protocol additionally enables fail back ability associated with the wait protocol being timed out for an initiating DBMS.

The process is initiated the wait protocol is extended with respect to integrated and distributed data stored within multiple differing data sources for allowing a real-time/up-to-date global view of data for populating within a target DBMS. The process includes:

Consolidating data access from multiple different data sources into a single data processor within accelerator server 139. A wait protocol is utilized to ensure data being processed are current. Upon receiving a query from a DBMS 139a with a target object timestamp (TOT1) and a timeout threshold, and query references tables from multiple sources (DBMS 139a and DBMS 139b), accelerator server 139 is configured to determine if all tables being referenced are valid for the wait protocol. Additionally, accelerator server 139 is configured to locate an owner for each table. For tables from DBMS 139a, accelerator server 139 will communicate with replication engine 112a and wait until TOT1 has reached a success state or a timeout threshold has reached a failure state. For tables from (source) DBMS 138b, accelerator server 139 will communicate with replication engine 112b and request current object timestamps (TOT2) for the table. Subsequently, replication engine 112b will wait until the target object timestamp (TOT2) has reached a success state or a timeout threshold has reached a failure state. If the aforementioned process is successful, then the query is executed with data consolidated from accelerator server 139. If the aforementioned process associated with DBMS 138a returns a failure state and the process associated with DBMS 138b returns a successful state, the query will be failed back to DBMS 138a and an associated data processor will return current data for additional source DBMSs from accelerator server 139 to DBMS 138a for final data consolidation. If the process associated with DBMS 138b returns a failure state, then the query is not executed and an error message is transmitted to DBMS 138a.

System 100 is enabled to access accelerator server 139 functionalities and scale up a wait protocol for multiple source DBMSs thereby enabling real-time analytics across multiple source DBMSs for possible fail back options for the query with respect to current data from additional source DBMSs.

Figure 2:
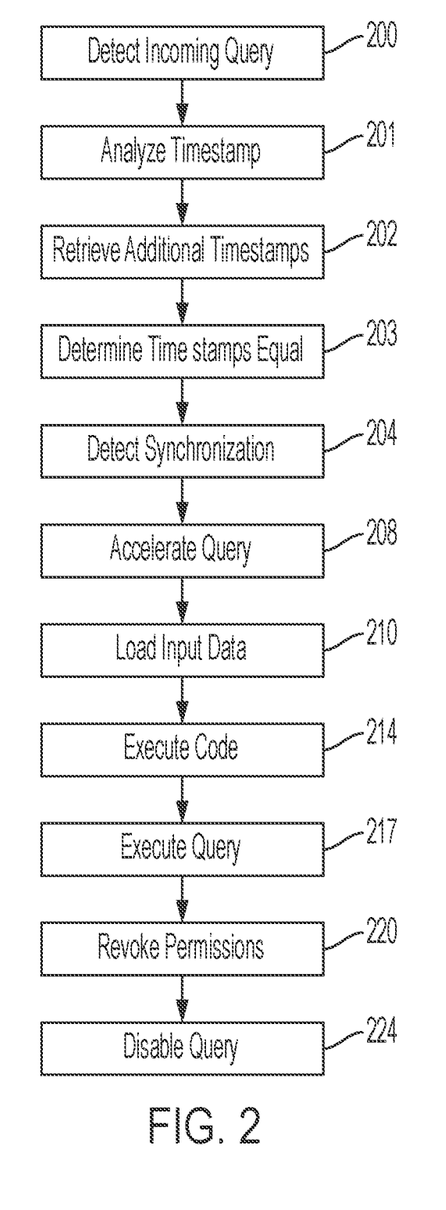
FIG. 2 illustrates an algorithm detailing a process flow enabled by the system of FIG. 1 for improving software and memory technology associated with accelerating a database query for execution with respect to a target database management system, in accordance with embodiments of the present invention.

FIG. 2 illustrates an algorithm detailing a process flow enabled by system 100 of FIG. 1 for improving software and memory technology associated with accelerating a database query for execution with respect to a target database management system, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by DBMS servers 138a and 138b, accelerator server 139, and target DBMS server 107. In step 200, an incoming query to be executed with respect to an accelerator server is detected. The accelerator server may include a shared accelerator server configured to be shared between multiple source DBMS systems operating in combination with respect to specified data associated with incoming analytical process based queries executed with respect to a first source DBMS system. The incoming analytical process based queries are enabled to access additional data from additional DBMS systems without physically hosting the additional data.

In step 201, an initial timestamp of the incoming query is analyzed. In step 202, additional timestamps of database tables referenced by the incoming query are retrieved. In step 203, it is determined (as a result of a comparison process) that the additional timestamps are equal to the initial timestamp. In step 204, it is determined (based on results of steps 202 and 203) that target data (from the database tables and located within a target database management system (DBMS)) is synchronized with source data of a source DBMS. In step 208, the incoming query is accelerated for execution with respect to the target DBMS. Additionally, temporary access by the accelerator server may be granted to the target DBMS.

In step 210, input data of at least one database table is loaded (from various source DBMS systems) into the shared accelerator server. In step 214, grant step code is executed for providing temporary access to a requestor DBMS comprising source tables (of the database tables) within the source DBMS. Additionally, reference creation code is executed for creating an executable link within the requestor DBMS for accessing database tables requiring accessed data within the requestor DBMS. In step 217, at least one incoming query from the requestor DBMS is executed. The at least one incoming query requires access (via the accelerator server) to data of database tables within the source DBMS.

In step 220, it is determined that access to data of the source DBMS has completed. In response, a reference removal process is executed with respect to the target DBMS and previously enabled permissions associated with enabling data sharing between a data requestor and the source DBMS are revoked.

In step 224, it is determined that data for a group of tables (of the database tables referenced by the incoming query) is not current with respect to data of the source DBMS. In response, execution of the incoming query is disabled until the data between the source DBMS and the target DBMS is currently synchronized.

Figure 3:
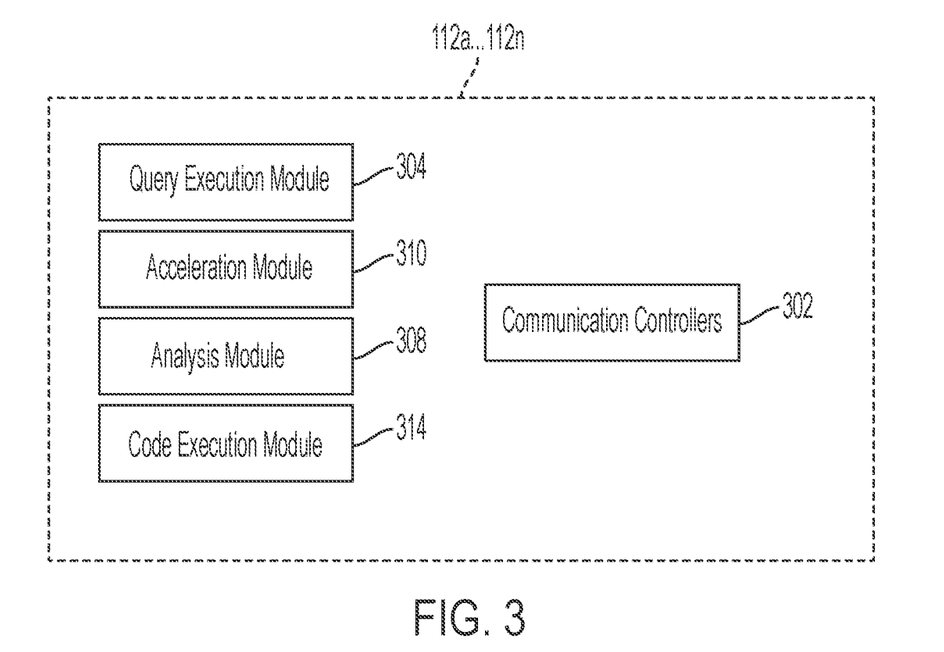
FIG. 3 illustrates an internal structural view of the circuitry/software of FIG. 1, in accordance with embodiments of the present invention.

FIG. 3 illustrates an internal structural view of replication engines 112a . . . 112n of FIG. 1, in accordance with embodiments of the present invention. Replication engines 112a . . . 112n includes a query execution module 304, an acceleration module 310, an analysis module 308, a code execution module 314, and communication controllers 302. Query execution module 304 comprises specialized hardware and software for controlling all functions related to query execution. Acceleration module 310 comprises specialized hardware and software for controlling all functionality related to control of all query acceleration processes for implementing the process described with respect to the algorithm of FIG. 2. Analysis module 308 comprises specialized hardware and software for controlling all functions related to the analysis steps of FIG. 2. Code execution module 314 comprises specialized hardware and software for controlling all functions related to executing software code implementing the processes of the algorithm of FIG. 2. Communication controllers 302 are enabled for controlling all communications between query execution module 304, an acceleration module 310, an analysis module 308, and a code execution module 314.

Figure 4:
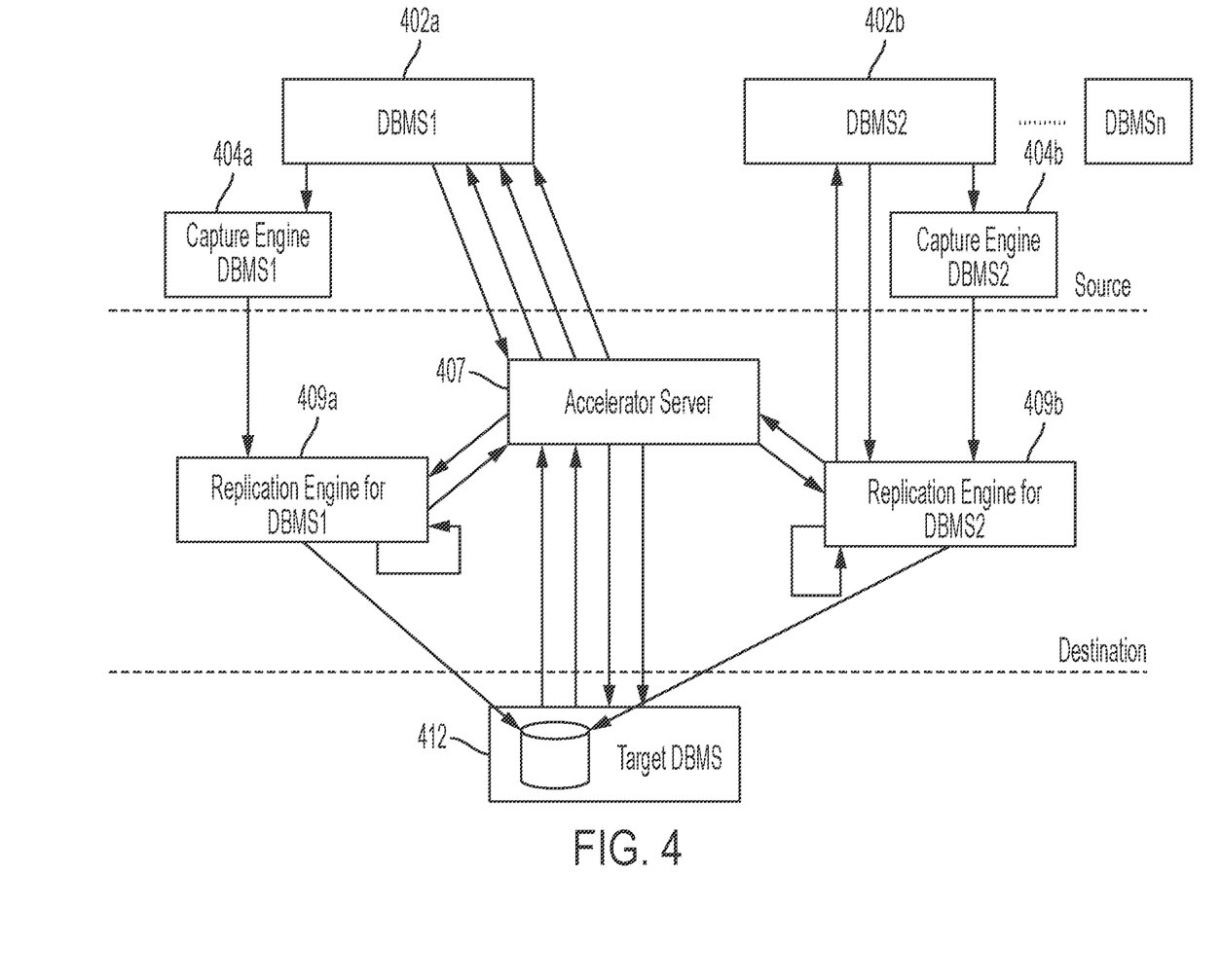
FIG. 4 illustrates a hybrid transactional/analytical process (HTAP) associated with flow of control and information associated with usage of a combination of federation and HTAP technologies with respect to query execution, in accordance with embodiments of the present invention.

FIG. 4 illustrates a hybrid transactional/analytical process (HTAP) 400 associated with flow of control and information associated with usage of a combination of federation and HTAP technologies with respect to query execution, in accordance with embodiments of the present invention. The process is initiated when a query is triggered with respect to a DBMS1 402a comprising a table T1 and DBMS2 402b comprising a table T2 (i.e., a federated table). Data for table T1 and table T2 are loaded from the respective (source) DBMS1 402a and DBMS2 402b into an accelerator server 407 via capture engines 404a and 404b. DBMS1 402a and DBMS2 402b pass control to accelerator server 407 for accelerating the query. In response, accelerator server 407 transmits information associated with: table T1, a table ID, a replication time stamp 1, and a timeout threshold to replication engine 409a (for DBMS1 402a) and simultaneously transmits a table ID and a timeout threshold for table T2 to a replication engine 409b for source DBMS2 402b. Subsequently, replication engine 409a (for DBMS1 402a) validates information associated with the table T1 and determines if replication engine 409a is currently processing any table T1 related information in its queue. If replication engine 409a is detected to be currently processing information regarding table T1, the process waits until processing and transmittal of data to a target DBMS 412 has completed before returning a success status to accelerator server 407. If a timeout threshold (for the process) has been reached, an error status (specifying a request processing error) is returned to accelerator server 407. The error status is returned back to source DBMS1 402a. On the DBMS2 402b side, replication engine 409b transmits a request to DBMS2 402b to retrieve an object level time stamp for timestamp TS2. When a value for TS2 reaches replication engine 409b, then the replication engine 409b validates the information associated with table T2 being valid and determines if it is currently processing any T2 related information within its queue. If replication engine 409*b* is currently processing information regarding T2, it waits until processing and transmittal of data to target DBMS 412 is complete before returning a success status to accelerator server 407. With respect to a case where a timeout threshold is reached, an error status (indicating unable to process the request) is returned to accelerator server 407. The error status is subsequently returned back to source DBMS 412. If replication engines 409*a* and 409*b* return success statuses, then the target DBMS is queried and data for both tables is returned (with a query result) to DBMS1 402*a*. If replication engine 409*a* returns an error status and replication engine 409*a* returns a success status, then a target DBMS is queried for table T2 data. The T2 data is returned to DBMS1 402*a* and is combined with T1 data in DBMS1 402*a*. If replication engine 409*b*, returns an error status, then an error status is returned back to DBMS1 402*a* as a failure to execute the query.

Figure 5:
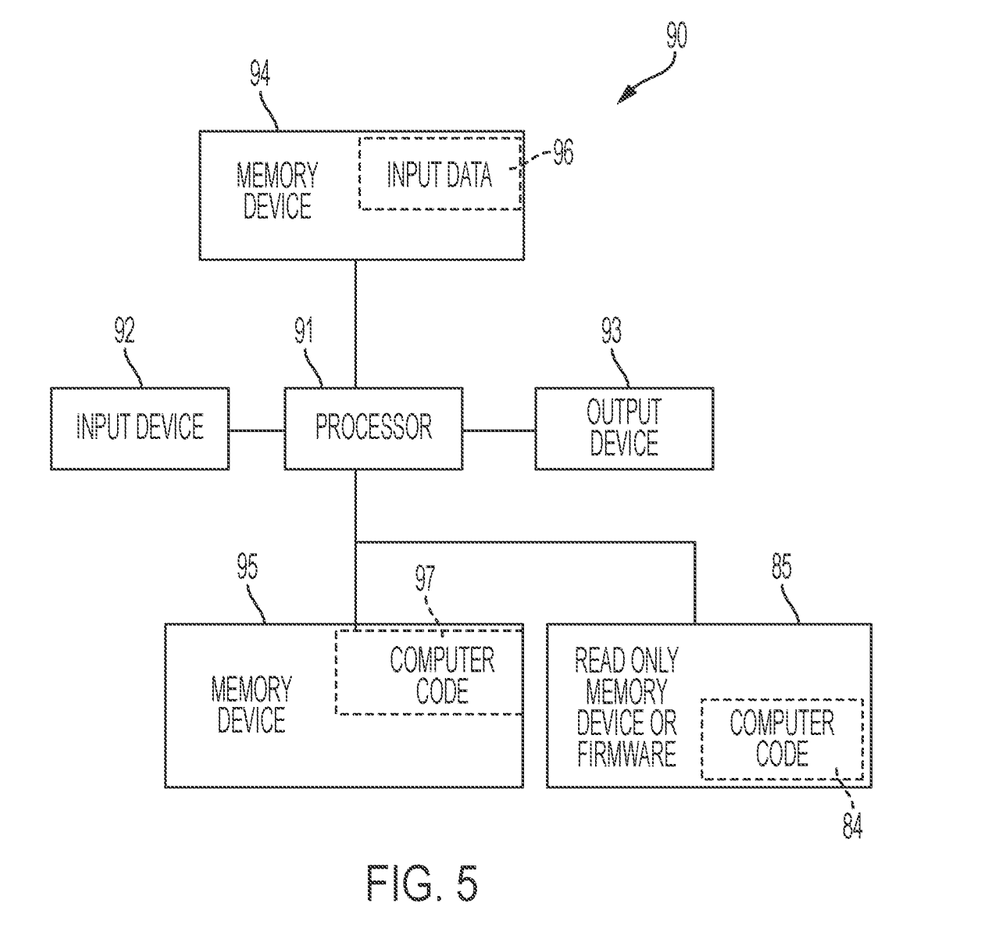
FIG. 5 illustrates a computer system used by the system of FIG. 1 for improving software and memory technology associated with accelerating a database query for execution with respect to a target database management system, in accordance with embodiments of the present invention.

FIG. 5 illustrates a computer system 90 (e.g., DBMS 138*a* and 138*b*, accelerator server 139, and/or target DBMS 07 of FIG. 1) used by or comprised by the system of FIG. 1 for improving software and memory technology associated with accelerating a database query for execution with respect to a target database management system, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, a network device 72 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and memory technology associated with accelerating a database query for execution with respect to a target database management system. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device). The networking device 72 is a device designed to communicate with other computer systems over networks commonly known as local area networks, wide area networks, campus area networks, and metropolitan area networks, using physical links such as, inter alia, wired, optical, or wireless, using data link protocols such as TCP/IP, UDP, ATM, Frame Relay, etc.

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and memory technology associated with accelerating a database query for execution with respect to a target database management system. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and memory technology associated with accelerating a database query for execution with respect to a target database management system. In another embodiment, the invention provides a business method that performs the process steps of the invention on a subscription, advertising, and/or fee basis. That is, a service supplier, such as a Solution Integrator, could offer to enable a process for improving software and memory technology associated with accelerating a database query for execution with respect to a target database management system. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
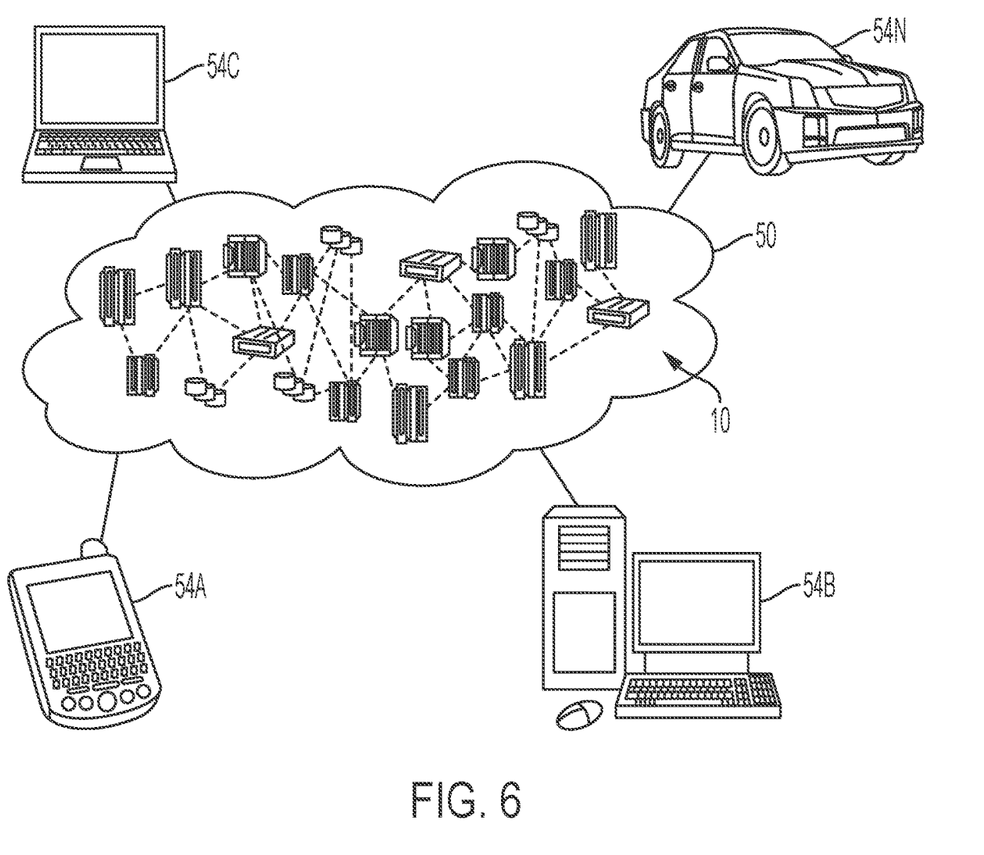
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
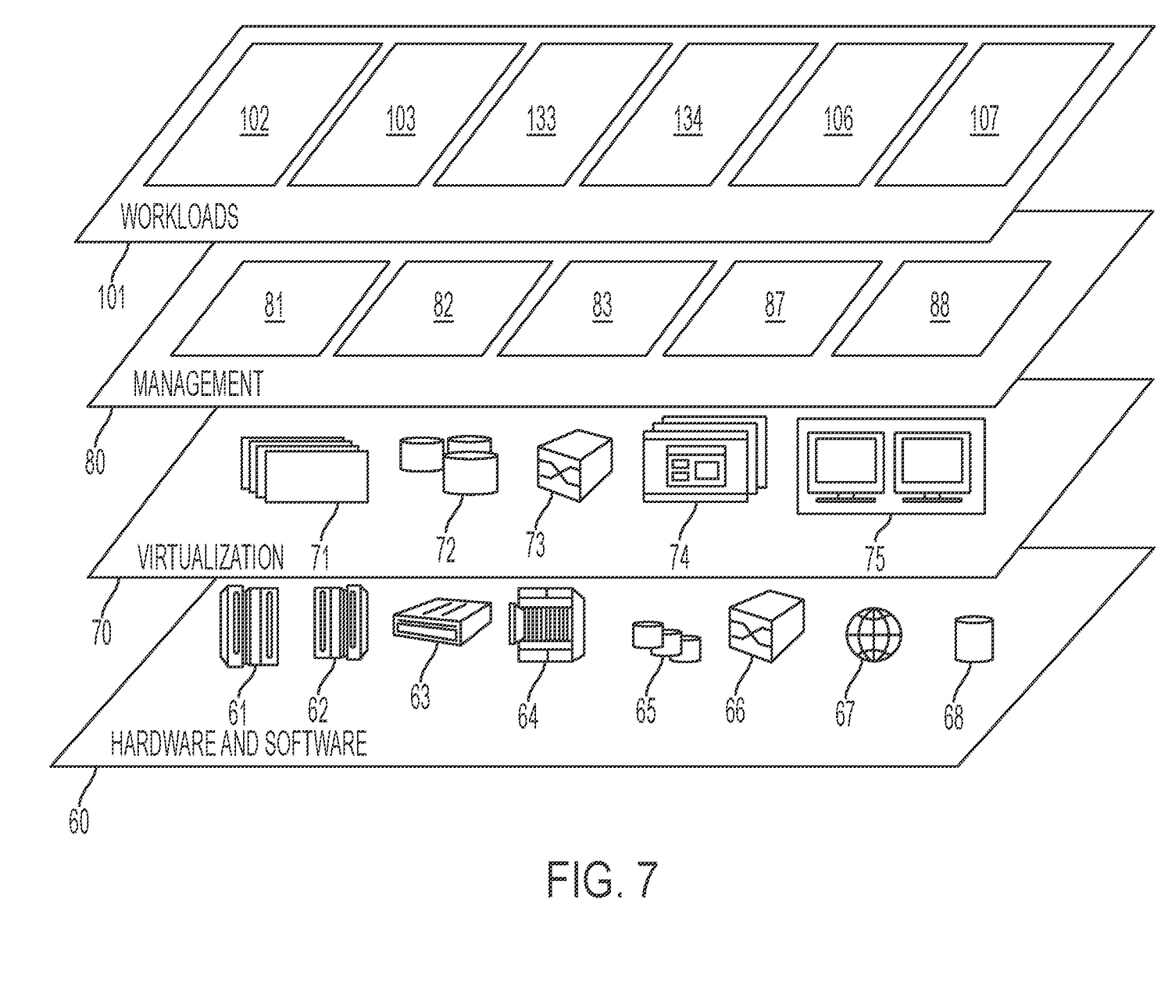
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software and memory technology associated with accelerating a database query for execution with respect to a target database management system 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A multiple source database coherency method comprising:
    detecting, by a processor of an accelerator server, an incoming query to be executed with respect to said accelerator server;
    analyzing, by said processor, an initial timestamp of said incoming query;
    retrieving, by said processor, additional timestamps of database tables referenced by said incoming query;
    first determining, by said processor, that each timestamp of said additional timestamps is reached with respect to a corresponding replication engine of said accelerator server;
    determining, by said processor based on results of said analyzing and said first determining, that target data from said database tables referenced by said incoming query and located within a target database management system (DBMS) is synchronized with source data of a source DBMS; and
    accelerating, by said processor in response to results of said determining, said incoming query for execution with respect to said target DBMS.

2. The method of claim 1, wherein said accelerator server comprises a shared accelerator server configured to be shared between multiple source DBMS' operating in combination with respect to specified data associated with incoming analytical process based queries executed with respect to a first source DBMS of said multiple source DBMS', and wherein said incoming analytical process based queries are enabled to access additional data from additional DBMS' of said multiple source DBMS' without physically hosting said additional data.

3. The method of claim 2, further comprising:
    loading, by said processor, input data of at least one database table of said database tables from various source DBMS' of said multiple source DBMS' into said shared accelerator server;
    executing, by said processor in response to determining that said incoming analytical process requires access data from various source DBMS', grant step code providing temporary access to a requestor DBMS comprising source tables of said database tables within said source DBMS; and
    executing, by said processor, reference creation code executed for creating an executable link within said requestor DBMS for accessing database tables requiring accessed data within said requestor DBMS.

4. The method of claim 3, further comprising:
    executing, by said processor, at least one incoming query from said requestor DBMS, wherein said at least one incoming query requires access, via said accelerator server, to data of database tables within said source DBMS.

5. The method of claim 1, further comprising:
    determining, by said processor, that access to data of said source DBMS has completed;
    executing, by said processor in response to said determining that said access to said data of said source DBMS has completed, a reference removal process with respect to said target DBMS; and
    revoking, by said processor, previously enabled permissions associated with enabling data sharing between a data requestor and said source DBMS.

6. The method of claim 1, further comprising:
    determining, by said processor, that data for a group of tables of said database tables referenced by said incoming query is not current with respect to data of said source DBMS; and
    disabling, by said processor, execution of said incoming query until the data between said source DBMS and said target DBMS is currently synchronized.

7. The method of claim 1, further comprising:
    granting, by said processor, temporary access by said accelerator server to said target DBMS.

8. The method of claim 1, further comprising:
    providing at least one support service for at least one of creating, integrating, hosting, maintaining, and deploying computer-readable code in the control hardware, said code being executed by the computer processor to implement: said detecting, said analyzing, said retrieving, said first determining, said determining, and said accelerating.

9. A computer program product, comprising a computer readable hardware storage device storing a computer readable program code, said computer readable program code comprising an algorithm that when executed by a processor of an accelerator server implements a multiple source database coherency method, said method comprising:
    detecting, by said processor, an incoming query to be executed with respect to said accelerator server;
    analyzing, by said processor, an initial timestamp of said incoming query;
    retrieving, by said processor, additional timestamps of database tables referenced by said incoming query;
    first determining, by said processor, that each timestamp of said additional timestamps is reached with respect to a corresponding replication engine of said accelerator server;
    determining, by said processor based on results of said analyzing and said first determining, that target data from said database tables referenced by said incoming query and located within a target database management system (DBMS) is synchronized with source data of a source DBMS; and accelerating, by said processor in response to results of said determining, said incoming query for execution with respect to said target DBMS.

10. The computer program product of claim 9, wherein said accelerator server comprises a shared accelerator server configured to be shared between multiple source DBMS' operating in combination with respect to specified data associated with incoming analytical process based queries executed with respect to a first source DBMS of said multiple source DBMS', and wherein said incoming analytical process based queries are enabled to access additional data from additional DBMS' of said multiple source DBMS' without physically hosting said additional data.

11. The computer program product of claim 10, wherein said method further comprises:
loading, by said processor, input data of at least one database table of said database tables from various source DBMS' of said multiple source DBMS' into said shared accelerator server;
executing, by said processor in response to determining that said incoming analytical process requires access data from various source DBMS', grant step code providing temporary access to a requestor DBMS comprising source tables of said database tables within said source DBMS; and
executing, by said processor, reference creation code executed for creating an executable link within said requestor DBMS for accessing database tables requiring accessed data within said requestor DBMS.

12. The computer program product of claim 11, wherein said method further comprises:
executing, by said processor, at least one incoming query from said requestor DBMS, wherein said at least one incoming query requires access, via said accelerator server, to data of database tables within said source DBMS.

13. The computer program product of claim 9, wherein said method further comprises:
determining, by said processor, that access to data of said source DBMS has completed;
executing, by said processor in response to said determining that said access to said data of said source DBMS has completed, a reference removal process with respect to said target DBMS; and
revoking, by said processor, previously enabled permissions associated with enabling data sharing between a data requestor and said source DBMS.

14. The computer program product of claim 9, wherein said method further comprises:
determining, by said processor, that data for a group of tables of said database tables referenced by said incoming query is not current with respect to data of said source DBMS; and
disabling, by said processor, execution of said incoming query until the data between said source DBMS and said target DBMS is currently synchronized.

15. The computer program product of claim 9, wherein said method further comprises:
granting, by said processor, temporary access by said accelerator server to said target DBMS.

16. An accelerator server comprising a processor coupled to a computer-readable memory unit, said memory unit comprising instructions that when executed by the processor implements a multiple source database coherency method comprising:
detecting, by said processor, an incoming query to be executed with respect to said accelerator server;
analyzing, by said processor, an initial timestamp of said incoming query;
retrieving, by said processor, additional timestamps of database tables referenced by said incoming query;
first determining, by said processor, that each timestamp of said additional timestamps is reached with respect to a corresponding replication engine of said accelerator server;
determining, by said processor based on results of said analyzing and said first determining, that target data from said database tables referenced by said incoming query and located within a target database management system (DBMS) is synchronized with source data of a source DBMS; and
accelerating, by said processor in response to results of said determining, said incoming query for execution with respect to said target DBMS.

17. The accelerator server of claim 16, wherein said accelerator server comprises a shared accelerator server configured to be shared between multiple source DBMS' operating in combination with respect to specified data associated with incoming analytical process based queries executed with respect to a first source DBMS of said multiple source DBMS', and wherein said incoming analytical process based queries are enabled to access additional data from additional DBMS' of said multiple source DBMS' without physically hosting said additional data.

18. The accelerator server of claim 17, wherein said method further comprises:
loading, by said processor, input data of at least one database table of said database tables from various source DBMS' of said multiple source DBMS' into said shared accelerator server;
executing, by said processor in response to determining that said incoming analytical process requires access data from various source DBMS', grant step code providing temporary access to a requestor DBMS comprising source tables of said database tables within said source DBMS; and
executing, by said processor, reference creation code executed for creating an executable link within said requestor DBMS for accessing database tables requiring accessed data within said requestor DBMS.

19. The accelerator server of claim 18, wherein said method further comprises:
executing, by said processor, at least one incoming query from said requestor DBMS, wherein said at least one incoming query requires access, via said accelerator server, to data of database tables within said source DBMS.

20. The accelerator server of claim 16, wherein said method further comprises:
determining, by said processor, that access to data of said source DBMS has completed;
executing, by said processor in response to said determining that said access to said data of said source DBMS has completed, a reference removal process with respect to said target DBMS; and
revoking, by said processor, previously enabled permissions associated with enabling data sharing between a data requestor and said source DBMS.

* * * * *